(12) United States Patent
Rivoli (10) Patent No.: US 7,964,983 B2
(45) Date of Patent: Jun. 21, 2011

(54) RETROFITTABLE WIND POWERED ELECTRIC GENERATOR

(76) Inventor: Louis D. Rivoli, Cedar Hill, MO (US)

( * ) Notice: Subject to any disclaimer, the term of this patent is extended or adjusted under 35 U.S.C. 154(b) by 254 days.

(21) Appl. No.: 12/366,265

(22) Filed: Feb. 5, 2009

(65) Prior Publication Data
US 2010/0194222 A1   Aug. 5, 2010

(51) Int. Cl.
*F03D 9/00* (2006.01)
(52) U.S. Cl. .......................... 290/55; 290/54
(58) Field of Classification Search ............ 290/55
See application file for complete search history.

(56) References Cited

U.S. PATENT DOCUMENTS

| | | | | |
|---|---|---|---|---|
| 4,039,848 A | * | 8/1977 | Winderl | 290/55 |
| 4,527,072 A | * | 7/1985 | van Degeer | 290/55 |
| 6,833,631 B2 | * | 12/2004 | Van Breems | 290/42 |
| 6,876,113 B1 | * | 4/2005 | Harris | 310/114 |
| 7,116,006 B2 | * | 10/2006 | McCoin | 290/54 |
| 7,133,329 B2 | * | 11/2006 | Skyggebjerg et al. | 368/113 |

* cited by examiner

*Primary Examiner* — T C Patel
*Assistant Examiner* — Iraj A Mohandesi
(74) *Attorney, Agent, or Firm* — Polster, Lieder, Woodruff & Lucchesi, LC (57) ABSTRACT

A wind powered electricity generating system is provided. The system includes a cylindrical induction coil sleeve coaxially mountable to and around a pole structure such that the pole extends structure through a cylindrical center aperture of the cylindrical induction coil sleeve. The system additionally includes a cylindrical rotator housing coaxially and rotatably mountable to and around the induction coil sleeve, and a plurality of wind vanes mounted to the rotator housing. The wind vanes are structured to capture wind and utilize the captured wind to rotate the cylindrical rotator housing about the cylindrical induction coil sleeve to generate electricity.

19 Claims, 6 Drawing Sheets

RETROFITTABLE WIND POWERED ELECTRIC GENERATOR

FIELD

The present teachings relate to wind driven electric generating devices, and more particularly to wind driven electric generating devices that can be retrofittably installed on existing structures.

BACKGROUND

The statements in this section merely provide background information related to the present disclosure and may not constitute prior art.

Renewable energy sources are becoming more prevalent and valuable in light of the movement to conserve and reduce the use of fossil fuels as an energy source. One such renewable energy source that has proven to be successful and viable is wind powered electric generators. Generally, known wind powered electric generators comprise large wind-mill type wind vanes to capture the wind. Such wind-mill type wind vanes are typically mounted to a support structure such that the wind vanes are laterally suspended or cantilevered from the side of the support structure and rotate about an axis that is generally orthogonal to the longitudinal axis of the support structure. The weight and torque generated by such wind vanes exert a considerable amount of lateral force on the respective support structures. Therefore, the support structures must be specifically designed and constructed to support the weight and forces exerted on them by such wind vanes. The costs associated with constructing such structures and the availability of open land required for their operation can make such known wind powered electric generators uneconomical or impractical.

SUMMARY

A wind powered electricity generating system is provided. The system includes a cylindrical induction coil sleeve coaxially mountable to and around a pole structure such that the pole structure extends through a cylindrical center aperture of the cylindrical induction coil sleeve. The system additionally includes a cylindrical rotator housing coaxially and rotatably mountable to and around the induction coil sleeve, and a plurality of wind vanes mounted to the rotator housing. The wind vanes are structured to capture wind and utilize the captured wind to rotate the cylindrical rotator housing about the cylindrical induction coil sleeve to generate electricity.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements.

Figure 1:
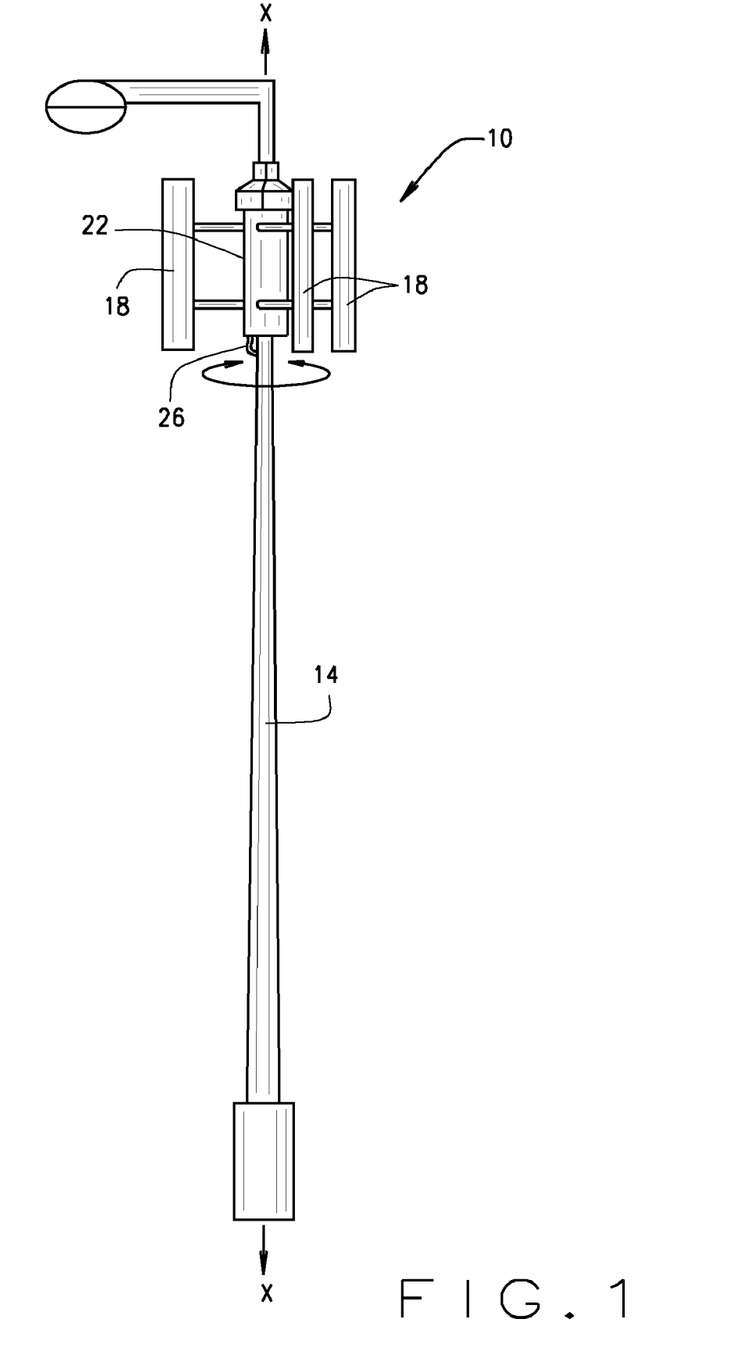
FIG. 1 is a retrofittable wind powered electricity generating system mounted to a pole structure, e.g., a light pole, in accordance with various embodiments of the present disclosure.

FIG. 1 illustrates a retrofittable wind powered electricity generating system (RWPEGS) 10 mounted to a pole structure 14. More particularly, the RWPEGS 10 is structured to be retrofittably mounted to any pole structure, e.g., pole structure 14, that has been constructed for a purpose other than supporting the RWPEGS, and the RWPEGS 10 is operable to generate electricity using the wind without exerting lateral forces on the pole structure 14 that will compromise the integrity of the pole structure 14, i.e., lateral forces that are greater than the pole structure 14 can withstand. More particularly, the RWPEGS 10 is mounted to the pole structure 14 such that the pole structure is disposed within a cylindrical (or other shaped) interior space, aperture, passage or bore. Moreover, the RWPEGS 10 is structured and operable to capture the wind, via wind vanes 18, and utilizes the captured wind to rotate a rotator housing (RH) 22, about a longitudinal center axis X of the pole structure 14 so that very little cumulative lateral force, i.e., force orthogonal to the axis X, is exerted on the pole structure in any direction.

Although the pole structure 14 is exemplarily illustrated in FIG. 1 as a street light pole, the pole structure 14 can be any pole structure suitable for mounting the RWPEGS 10, as described herein, such as a flag pole, a traffic light pole, an electrical utility pole, etc. In various embodiments, the pole structure 14 can be a pole structure wherein extraneous and/or intrinsic electrical current carrying cables or wires are attached to, disposed within, supported by or in close approximation to the pole structure 14, such that an output cable 26 for carrying electricity generated and output by the RWPEGS 10, as described below, can be electrically coupled to such extraneous and/or intrinsic electrical current carrying cables.

Figure 2:
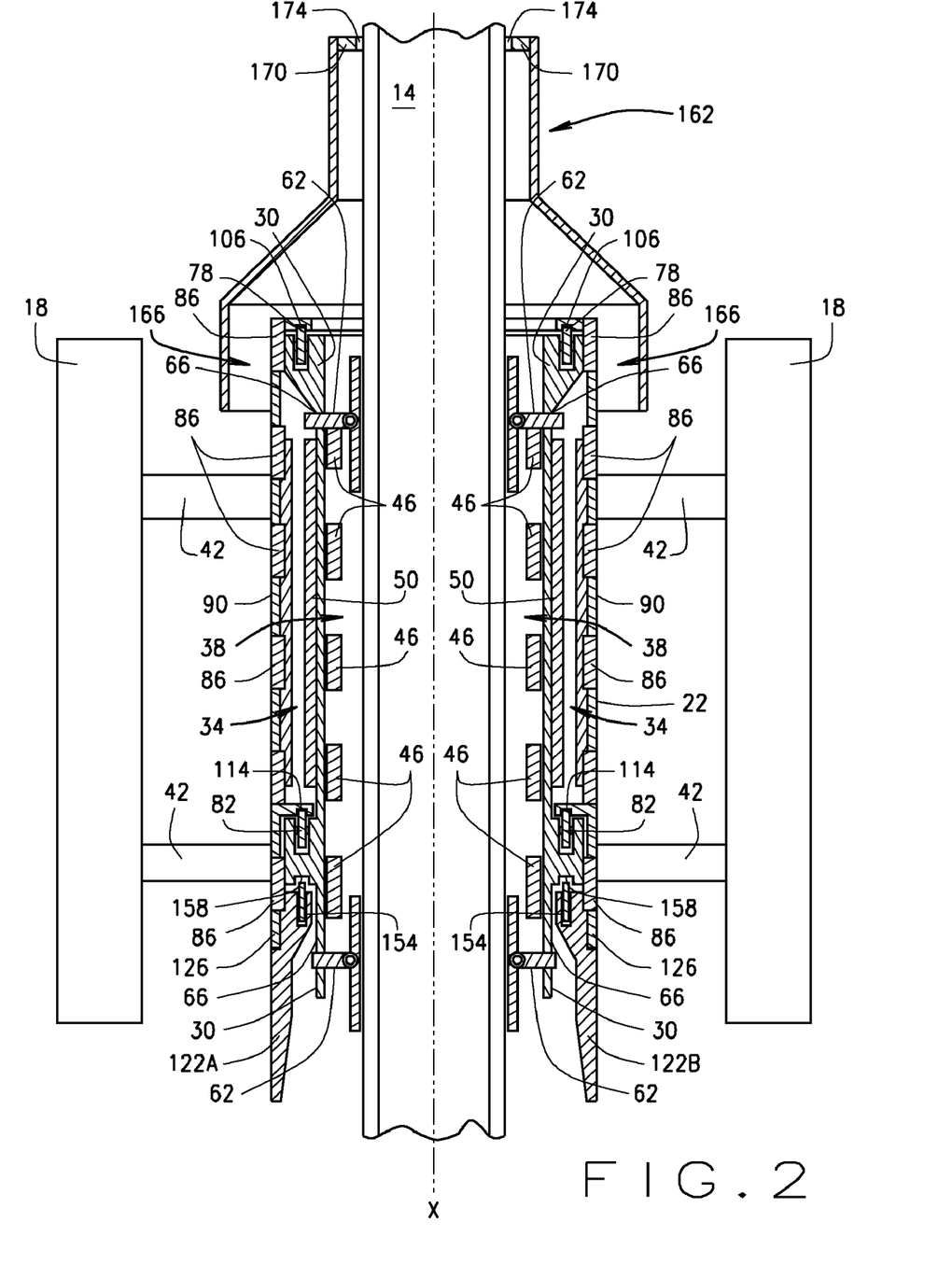
FIG. 2 is a sectional view of the retrofittable wind powered electricity generating system, shown in FIG. 1, in accordance with various embodiments of the present disclosure.
Figure 3:
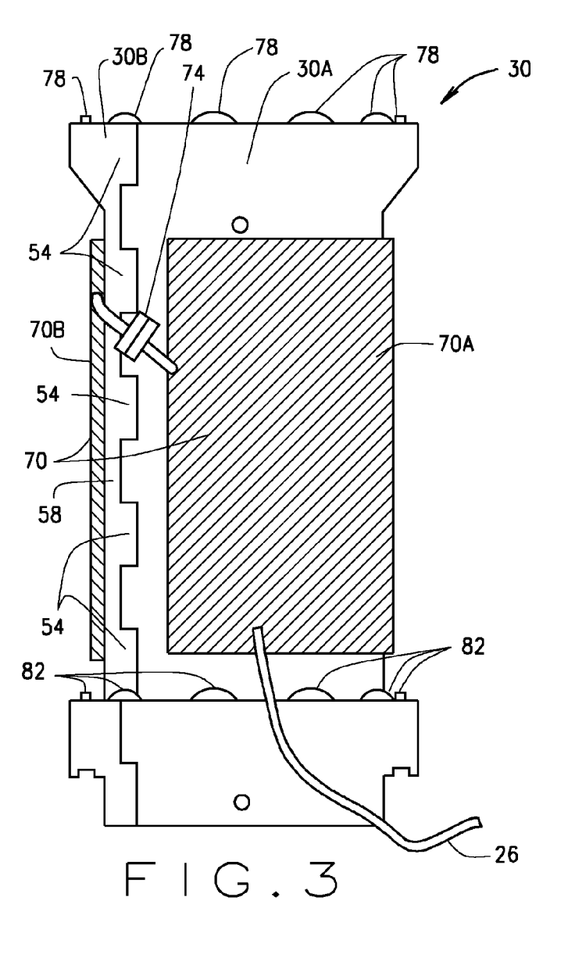
FIG. 3 is a side view of a cylindrical induction coil sleeve of the retrofittable wind powered electricity generating system, shown in FIG. 1, in accordance with various embodiments of the present disclosure.
Figure 4:
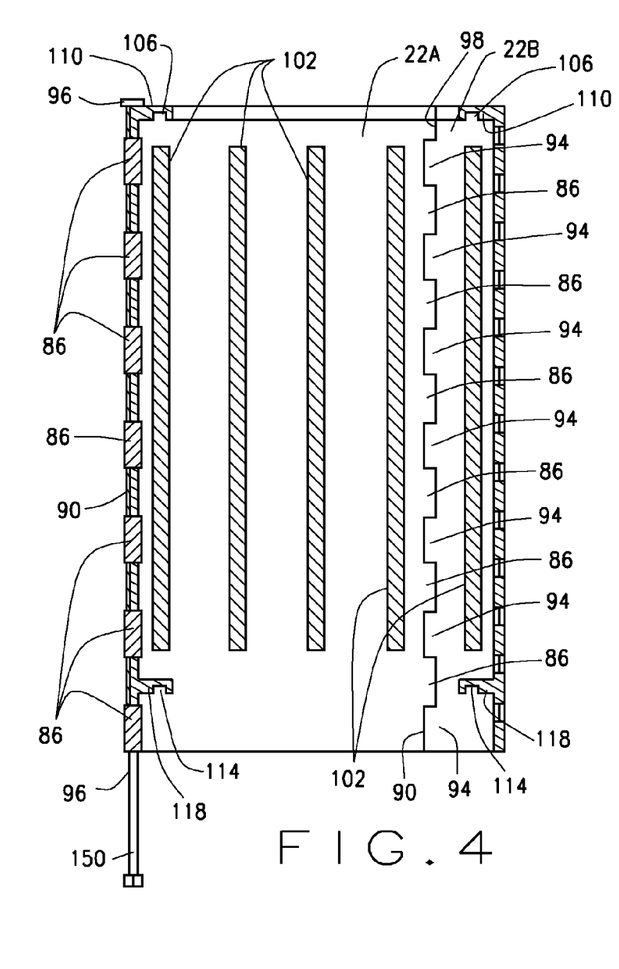
FIG. 4 is a side view of one of a pair of halves of a rotator housing of the retrofittable wind powered electricity generating system, shown in FIG. 1, in accordance with various embodiments of the present disclosure.

Referring now to FIGS. 2, 3 and 4, in various embodiments, the RWPEGS 10 includes a cylindrical induction coil sleeve (ICS) 30 mounted to the pole structure 14 and disposed within a cylindrical RH center aperture 34 of the cylindrical rotator housing 22. More particularly, the induction coil sleeve 30 is structured to be coaxially mounted to and around the pole structure 14 having the pole structure 14 extending through a cylindrical ICS center aperture 38 of the cylindrical induction coil sleeve 30 and the rotator housing 22 is structured to be coaxially and rotatably mounted to and around the induction coil sleeve 30. Accordingly, the induction coil sleeve 30 and the rotator housing 22 each have substantially the same longitudinal center axis as the support structure 10, i.e., longitudinal center axis X. A plurality of the wind vanes 18 are connected to, and equally spaced around, the rotator housing 22, via a plurality of vane support arms 42. The wind vanes 18 are structured to capture the wind and utilize the captured wind to rotate the cylindrical rotator housing 22 about the cylindrical induction coil sleeve 30 to generate electricity, as described below.

In various embodiments, the induction coil sleeve 30 is a two-part induction coil sleeve including an ICS first half 30A and an ICS second half 30B that are connectable to each other around the pole structure 14 to coaxially position the pole structure 14 within the cylindrical center aperture 38 of the induction coil sleeve 30. That is, the induction coil sleeve 30 can be mounted to and around the pole structure 14 by placing each of the ICS halves 30A and 30B adjacent opposing sides of the pole structure 14, then connecting the ICS halves 30A and 30B together and mounting, or attaching, the assembled induction coil sleeve 30, i.e., the connected ICS halves 30A and 30B, to the pole structure 14.

The ICS first and second halves 30A and 30B can be connected together using any suitable connecting method, means, structure or device. For example, in various embodiments, the ICS first half 30A can include a plurality of equally spaced apart ICS first pin receptacles 46 (FIG. 2) extending from opposing distal edges 50 of the ICS first half 30A. Similarly, the ICS second half 30B can include a plurality of equally spaced apart ICS second pin receptacles 54 (FIG. 3) extending from opposing distal edges 58 of the ICS second half 30B. Accordingly, the ICS first and second halves 30A and 30B can be positioned around opposing sides of the pole structure 14 such that the ICS first and second pin receptacles 46 and 54 are interstitially engaged and coaxially aligned with each other. That is, the ICS first pin receptacles 46 will be positioned within the spaces between the ICS second pin receptacles 54, and the ICS second pin receptacles 54 will be positioned within the spaces between the ICS first pin receptacles 46. Additionally, once the ICS first and second pin receptacles 46 and 54 are interstitially engaged, longitudinal center bores (not shown) of the ICS first pin receptacles 46 will be substantially coaxially aligned with longitudinal center bores (not shown) of the ICS second pin receptacles 54. Subsequently, securing pins (not shown), such as ball lock pins or bolts, can be inserted through the respective coaxially aligned center bores of the interstitially engaged ICS first and second pin receptacles 46 and 54 to securely connect the ICS first and second halves 30A and 30B around the pole structure 14.

Thereafter, the assembled induction coil sleeve 30 can be mounted, or connected, to the pole structure 14 extending through the ICS center aperture 38 such that the assembled induction coil sleeve 30 is coaxially aligned with the axis X of the pole structure 14. The assembled induction coil sleeve 30 can be mounted, or connected, to the pole structure 14 using any suitable method, means, device or structure. For example, in various embodiments, the assembled induction coil sleeve 30 can be mounted, or connected, to the pole structure 14 using a plurality of adjustable mounting brackets 62 that extend radially inward from an inner surface of the assembled induction coil sleeve 30 and are adjustable in length such that the assembled induction coil sleeve 30 can be mounted, or connected, to pole structures, e.g., pole structure 14, of various diameters, shapes, sizes and dimensions. As an example, in various implementations, the adjustable mounting brackets 62 can comprise threaded tension screw clamps that are threaded through threaded bores 66 in the ICS first and second halves 30A and 30B. Once the induction coil sleeve 30 is assembled around the pole structure, as described above, the threaded tension screw clamps 62 can be adjusted in the radial direction, i.e., the direction orthogonal to the axis X, to securely mount, or connect, the assembled induction coil sleeve 30 to the pole structure 14.

Referring now to FIGS. 2 and 3, the induction coil sleeve 30 further includes a sectioned induction coil 70 having a first section 70A mounted to the ICS first half 30A and a second section 70B mounted to the ICS second half 30B. The induction coil first and second sections 70A and 70B are electrically connectable to each other via at least one decoupleable electrical connector 74, i.e., a connector that can be connected to make electrical contact between the induction coil first and second sections 70A and 70B and disconnected to terminate contact between the induction coil first and second sections 70A and 70B.

As best shown in FIG. 3, the induction coil sleeve 30 further includes a plurality of upper rollers, or bearings, 78 rotationally mounted to an upper portion of each of the ICS first and second halves 30A and 30B. Additionally, the induction coil sleeve 30 includes a plurality of lower rollers, or bearings, 82 rotationally mounted to a lower portion of the ICS first and second halves 30A and 30B.

Referring now to FIGS. 2 and 4, in various embodiments, the rotator housing 22 is a two-part rotator housing including a RH first half 22A and a RH second half 22B that are connectable to each other around the induction coil sleeve 30 and pole structure 14 to coaxially position the induction coil sleeve 30 and the pole structure 14 within the cylindrical center aperture 34 of the rotator housing 22. More particularly, the rotator housing 22 is rotationally mounted to and around the induction coil sleeve 30 by placing each of the RH halves 22A and 22B adjacent opposing exterior sides of the induction coil sleeve 30, i.e., adjacent the induction coil sections 70A and 70B, then connecting the RH halves 22A and 22B together and rotationally mounting the assembled rotator housing, i.e., the connected RH halves 22A and 22B, to the induction coil sleeve 30.

The RH first and second halves 22A and 22B can be connected together using any suitable connecting method, means, structure or device. For example, in various embodiments, the RH first half 22A can include a plurality of equally spaced apart RH first pin receptacles 86 extending from opposing distal edges 90 of the RH first half 22A. Similarly, the RH second half 22B can include a plurality of equally spaced apart RH second pin receptacles 94 (FIG. 4) extending from opposing distal edges 98 of the RH second half 22B. Accordingly, the RH first and second halves 22A and 22B can be positioned around opposing sides of the induction coil sleeve 30 such that the RH first and second pin receptacles 86 and 94 are interstitially engaged and coaxially aligned with each other. That is, the RH first pin receptacles 84 will be positioned within the spaces between the RH second pin receptacles 94, and the RH second pin receptacles 94 will be positioned within the spaces between the RH first pin receptacles 86. Additionally, once the RH first and second pin receptacles 86 and 94 are interstitially engaged, longitudinal center bores (not shown) of the RH first pin receptacles 86 will be substantially coaxially aligned with longitudinal center bores (not shown) of the RH second pin receptacles 94. Subsequently, securing pins 96 (only one shown) can be inserted through the respective coaxially aligned center bores of the interstitially engaged RH first and second pin receptacles 86 and 94 to securely connect the RH first and second halves 22A and 22B around the induction coil sleeve 30. In various embodiments, the securing pins 96 can be ball lock pins or bolts.

The rotator housing 22 further includes a plurality of rotator magnets 102 mounted to the RH first and second halves 22A and 22B. The rotator magnets 102 equally spaced and longitudinally disposed along an inner surface of the rotator housing 22 to create a magnetic flux field around the induction coil 70 such that electrical current will be induced, i.e., generated, within the induction coil 70 when the rotator housing 22 is rotated about the induction coil sleeve 30, as described below.

As best shown in FIG. 4, the rotator housing 22 further includes an upper roller track 106 formed in an upper lip 110 of rotator housing 22. The upper roller track 106 is structured to receive the upper rollers/bearings 78 of the induction coil sleeve 30. Additionally, the rotator housing includes a lower roller track 114 formed in a lower lip 118 of rotator housing 22. The lower roller track 114 is structured to receive the lower rollers/bearings 82 of the induction coil sleeve 30. Thus, once the RH first and second halves 22A and 22B are coupled together around the induction coil sleeve 30, the ICS upper rollers/bearings 78 are placed within the upper roller track 106 and the lower rollers/bearings 82 are placed within the lower roller track 114, thereby rotationally mounting the rotator housing 22 on the induction coil sleeve 30 such that the rotator housing 22 is centered about the induction coil sleeve 30. Moreover, having the upper and lower rollers/bearings 78 and 82 located within the respective upper and lower roller tracks 106 and 114 allows the rotator housing 22 to freely, coaxially rotate about the induction coil sleeve 30, which is stationarily mounted to the pole structure 14.

More particularly, having rotator housing rotationally mounted on the induction coil sleeve 30, as described above, allows the rotator magnets 102 to be rotated about the induction coil 70, thereby inducing, i.e., generating, a current flow within the induction coil and through the output cable 26. Thus, wind captured by the wind vanes 18 will cause the rotator housing 22 to coaxially rotate about the induction coil sleeve 30 such that the rotator magnets are coaxially rotated about the induction coil 70, there by generating a current flow through the output cable 26.

In various embodiments, the output cable 26 can be connected to one or more extraneous electrical current carrying cables or wires attached to, disposed within, supported by or in close approximation to the pole structure 14, such that the current generated by the RWPEGS 10 can be carried to and/or utilized at a location remote from the pole structure 14.

Referring now to FIGS. 2, 5A, 5B and 5C, in various embodiments, the RWPEGS 10 further includes a rotator housing retainer 122 connectable to the rotator housing 22 to retain the upper and lower rollers/bearings 78 and 82 within the respective upper and lower roller tracks 106 and 114. The rotator housing retainer 122 can be any device, component, apparatus or mechanism that is suitably structured and operable to retain the upper and lower rollers/bearings 78 and 82 within the respective upper and lower roller tracks 106 and 114.

Figures 5A, 5B, 5C:
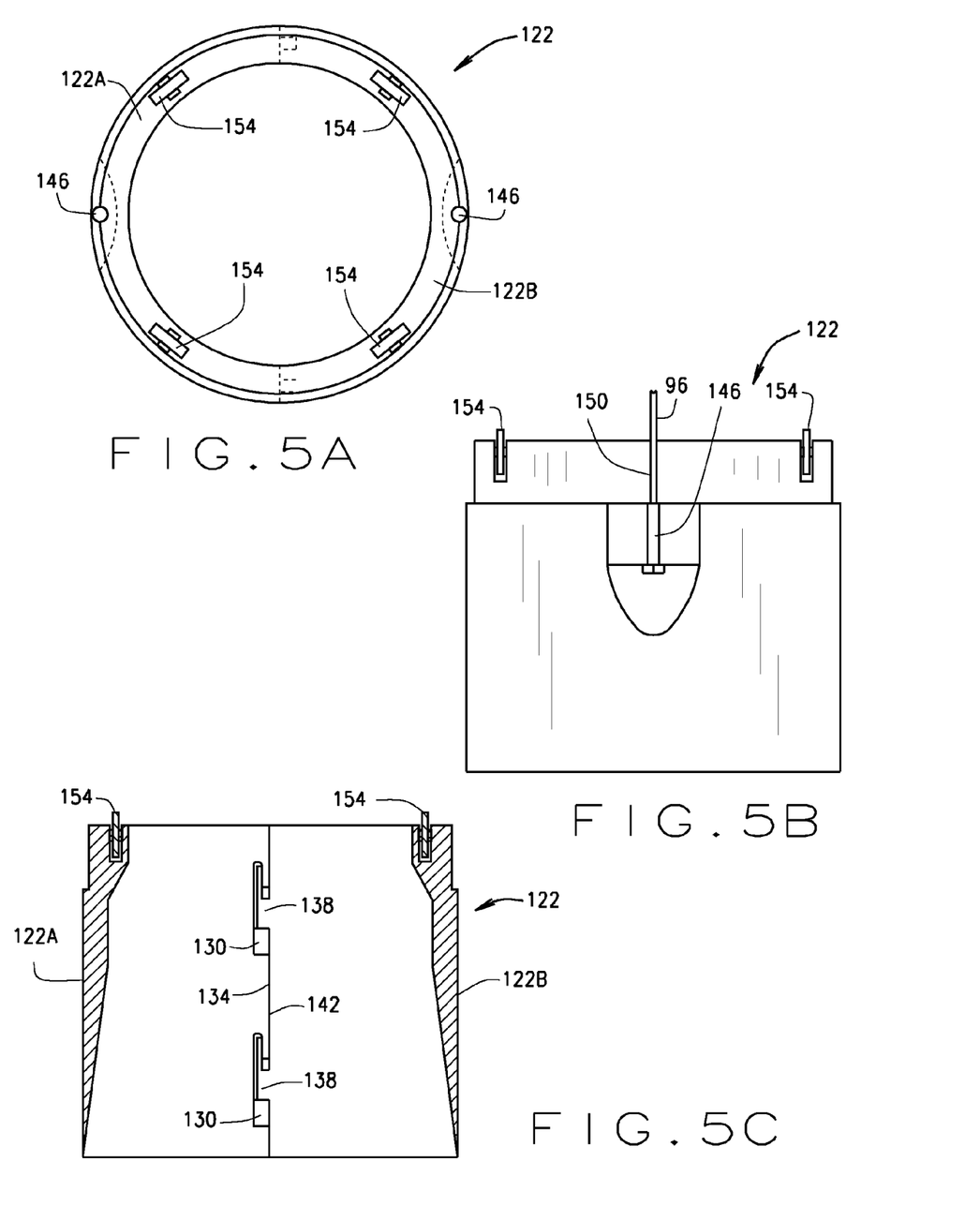
FIG. 5A is a top view of a rotator housing retainer of the retrofittable wind powered electricity generating system, shown in FIG. 1, in accordance with various embodiments of the present disclosure.
FIG. 5B is a side view of the rotator housing retainer of the retrofittable wind powered electricity generating system, shown in FIG. 1, in accordance with various embodiments of the present disclosure.
FIG. 5C is a cross-sectional view of the rotator housing retainer of the retrofittable wind powered electricity generating system, shown in FIG. 1, in accordance with various embodiments of the present disclosure.

For example, in various embodiments, the rotator housing retainer can be a two-piece rotator housing retainer connectable to a bottom flange 126 of the rotator housing 22. In such embodiments, the rotator housing retainer (RHR) 122 can include a RHR first half 122A and a RHR second half 122B that are connectable to and around the rotator housing bottom flange 126 using any suitable connecting method, means, structure or device. For example, in various embodiments, the RHR first half 122A can include a plurality of interlocking grooves 130 formed along opposing RHR first half distal edges 134 and the RHR second half 122B can include a plurality of interlocking posts 138 extending from opposing RHR second half distal ends 142. The interlocking posts 138 are interlockingly mateable with interlocking grooves 130 such that the RHR first and second halves 122A and 122B can be placed around the bottom flange 126 and interlockingly engaged to form the rotator housing retainer 122.

The assembled rotator housing retainer 122 can be securely connected to the rotator housing bottom flange using any suitable connecting device, component, apparatus or mechanism. For example, in various embodiments, the RHR first and second halves 122A and 122B can each include a RHR retainer pin receptacle 146 that is structured to receive distal end portions 150 of the rotator housing securing pins 96. That is, in such embodiments, the rotator housing securing pins 96 have a length such that the distal end portions 150 extend past the bottom flange 126 of the rotator housing 22. Accordingly, once the rotator housing retainer is assembled, as described above, the distal end portions 150 of the rotator housing securing pins 96 can be inserted through the RHR retainer pin receptacles 146. Subsequently, a threaded nut can be threaded onto threads formed in the distal end portion 150 of the rotator housing securing pins 96 to secure the rotator housing retainer 122 to the rotator housing 22.

Referring now to FIGS. 2, 3, 5A, 5B and 5C, to retain the rotator housing 22 in place on the induction coil sleeve upper and lower rollers/bearings 78 and 82, the rotator housing retainer includes a plurality of RHR rollers/bearings 154 rotationally mounted to an upper portion of each of the RHR first and second halves 122A and 122B. Additionally, the induction coil sleeve 30 includes an inverted roller track 158 formed in a lower edge of a housing for the ICS lower rollers/bearings 82. As illustrated in FIG. 2, when the rotator housing retainer 122 is connected to the bottom flange 126 of the rotator housing 22, the RHR rollers/bearings 154 are placed within the inverted roller track 158. Accordingly, once the rotator housing retainer 122 is connected to the bottom flange 126 of the rotator housing 22, the rotator housing 22 is prevented from separating from the induction coil sleeve 30, i.e., the induction coil sleeve upper and lower rollers/bearings 78 and 82 are securely retained within the respective rotator housing upper and lower tracks 106 and 114, due to the engagement of the RHR rollers/bearings 154 within the inverted roller track 158.

Figure 6A:
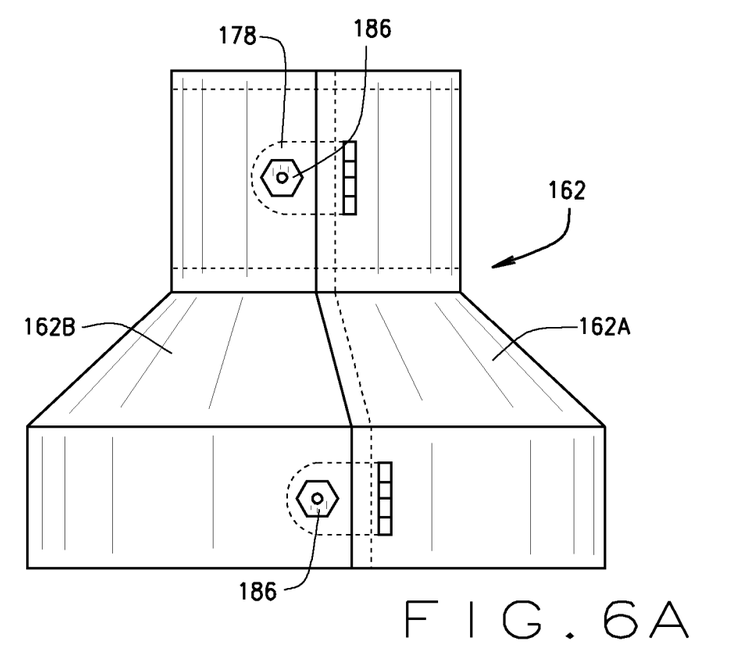
FIG. 6A is a side view of a weather protection hood of the retrofittable wind powered electricity generating system, shown in FIG. 1, in accordance with various embodiments of the present disclosure.
Figure 6B:
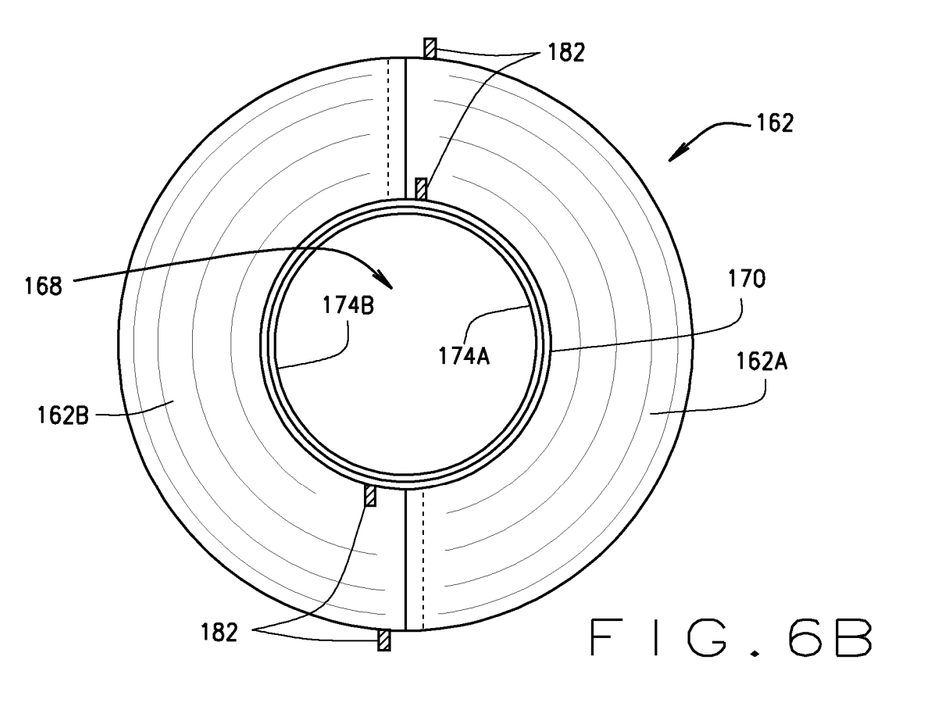
FIG. 6B is a top view of the weather protection hood of the retrofittable wind powered electricity generating system, shown in FIG. 1, in accordance with various embodiments of the present disclosure.

Referring now to FIGS. 2, 6A and 6B, in various embodiments, the RWPEGS 10 further includes a weather protection hood 162 that is mounted to the pole structure 14 above the assembled induction coil sleeve 30 and rotator housing 22 such that the weather protection hood 162 covers the top of the assembled induction coil sleeve 30 and rotator housing 22 and overhangs, surrounds and encompasses at least a top portion 166 of the exterior side of the assembled induction coil sleeve 30 and rotator housing 22. The weather protection hood 162 is a two-piece hood that includes a WPH first half 162A and a second half 162B that are connectable to each other and mounted to the pole in a weather tight fashion such that rain, sleet, snow, debris, bird droppings and other foreign matter can not enter the top of the assembled induction coil sleeve 30 and rotator housing 22 and damage, contaminate, corrode, etc., the assembled induction coil sleeve 30 and rotator housing 22.

The two-piece weather protection hood 162 can be assembled and coupled to the pole structure 14 using any suitable coupling method, means, device, apparatus or structure. For example, in various embodiments, the WPH first and second halves 162A and 162B can be placed on adjacent sides of the pole structure and coupled together around the pole structure 14, having the pole structure 14 extending through a WPH center aperture 168, using any suitable fastening means, e.g., tension lock hinge clamps 178. More particularly, the WPH first and second halves can be coupled together such that a perimeter edge 170 of the WPH center aperture 168 engages the pole structure 14 and securely clamps the pole structure 14 within the WPH center aperture 168, i.e., between the coupled together WPH first and second halves 162A and 162B. Alternatively, each of the WPH first and second halves 162A and 162B can include one or more tension lock threaded tabs 182 that pass through respective mated bores of the tension lock hinge clamps 178 of the WPH first and second halves 162A and 162B, which can subsequently be secured with lock nuts 183, or other joining means, whereby the tension lock hinge clamps 178 are used to mount the assembled weather protection hood 162 to the pole structure 14.

In various embodiments, the weather protection hood 162 includes a weather seal 174 disposed around a WPH center aperture perimeter edge 170. More particularly, the weather seal 174 is a two-piece weather seal having opposing first and second pieces 174A and 174B mounted to the WPH center aperture perimeter edge 170 of the respective WPH first and second halves 162A and 162B. In various forms, the weather seal first and second pieces 174A and 174B overlap each other at the connection joints of the WPH first and second halves 162A and 162B. When the WPH first and second halves 162A and 162B are assembled, i.e., coupled together, around the pole structure 14, the weather seal 174 is compressed between the pole structure 14 and the WPH center aperture perimeter edge 170 to provide a weather tight seal therebetween.

Figure 7A:
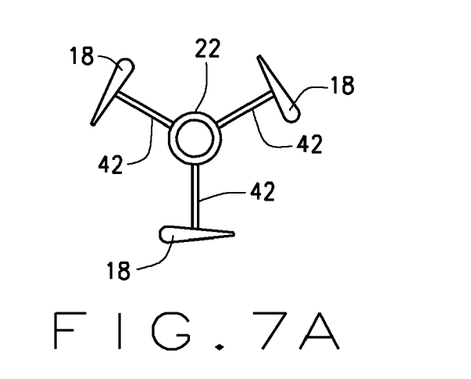
FIG. 7A is a top view of a rotator housing of retrofittable wind powered electricity generating system, shown in FIG. 1, illustrating tapered wing shaped wind vanes suspended radially orthogonally from the rotator housing, in accordance with various embodiments of the present disclosure.
Figure 7B:
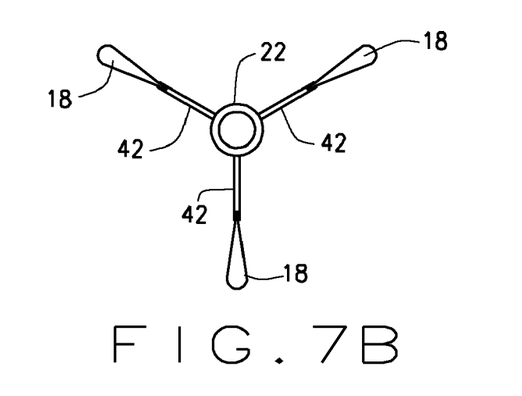
FIG. 7B is a top view of a rotator housing of retrofittable wind powered electricity generating system, shown in FIG. 1, illustrating tapered paddle shaped wind vanes suspended radially outward from the rotator housing, in accordance with various embodiments of the present disclosure.
Figure 7C:
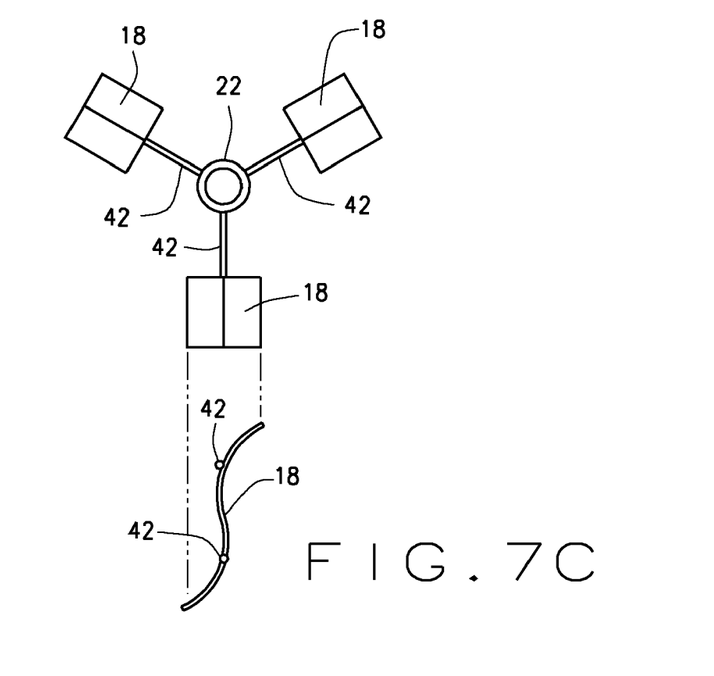
FIG. 7C is a top view of a rotator housing of retrofittable wind powered electricity generating system, shown in FIG. 1, illustrating S-shaped panel wind vanes suspended radially outward from the rotator housing, in accordance with various embodiments of the present disclosure.

Referring now to FIGS. 2, 7A, 7B and 7C, the wind vanes 18 can be structured to have any form and profile suitable to capture wind and utilize the captured wind to longitudinally rotate the rotator housing 22 about the induction coil sleeve, i.e., about the longitudinal axis X. For example, as illustrated in FIG. 2, in various embodiments, the wind vanes 18 can have a flat panel form, wherein each flat panel is collinearly mounted to a distal end of one or more respective vane support arms 42. As illustrated in FIG. 7A, in various other exemplary embodiments, the wind vanes 18 can have a tapered wing form, wherein each tapered wing is orthogonally mounted to a distal end of one or more respective vane support arms 42. Alternatively, as exemplarily illustrate in FIG. 7B, in various embodiments, the wind vanes 18 can have a tapered panel form, wherein each tapered panel is colinearly mounted to a distal end of one or more respective vane support arms 42. In yet other embodiments, as exemplarily illustrated in FIG. 7C, the wind vanes 18 can have a slanted S-shaped panel form, wherein each slanted S-shaped panel is colinearly mounted to a distal end of one or more respective vane support arms 42.

Although FIG. 1 illustrates a single RWPEGS 10 mounted to the pole structure 14, it is envisioned that two or more RWPEGSs 10 can be mounted to a single pole structure 14, as described above, such that each RWPEGS 10 is operable, as described above, to provide additional sources electrical energy, i.e., electrical current.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A wind powered electricity generating system, said system comprising:
    a two-piece cylindrical induction coil sleeve coaxially mountable to and around a pole structure having the pole structure extending through a cylindrical center aperture of the cylindrical induction coil sleeve, the two-piece induction coil sleeve including an induction coil sleeve (ICS) semi-cylindrical first half and an induction coil sleeve (ICS) semi-cylindrical second half that are longitudinally connectable to each other around the pole structure to coaxially position the pole structure within the cylindrical center aperture of the induction coil sleeve;
    a two-piece cylindrical rotator housing coaxially and rotatably mountable to and around the two-piece induction coil sleeve; and
    a plurality of wind vanes mounted to an exterior surface of the two-piece rotator housing, the wind vanes structured to capture wind and utilize the captured wind to rotate the two-piece cylindrical rotator housing about the two-piece cylindrical induction coil sleeve to generate electricity.

2. The system of claim 1, wherein the ICS first half comprises a plurality of ICS first pin receptacles extending from opposing distal edges of the ICS first half, and the ICS second half comprises a plurality of ICS second pin receptacles extending from opposing distal edges of the ICS second half, the ICS first and second halves structured such that the ICS first and second halves can be oppositely positioned around the pole structure having the ICS first and second pin receptacles interstitially engaged and coaxially aligned such that securing pins can be inserted through the respective engaged and aligned ICS first and second pin receptacles to connect the ICS first and second halves around the pole structure.

3. The system of claim 1, wherein the induction coil sleeve further comprises a sectioned induction coil having a first section mounted to the ICS first half and a second section mounted to the ICS second half, the induction coil first and second sections electrically connectable to each other via at least one decoupleable electrical connector.

4. The system of claim 1, wherein each of the ICS first and second halves comprises a plurality of upper rollers or bearings rotationally mounted to an upper portion of the ICS first and second halves, and a plurality of lower rollers or bearings rotationally mounted to a lower portion of the ICS first and second halves.

5. The system of claim 4, wherein the rotator housing comprises a rotator housing (RH) semi-cylindrical first half and a rotator housing (RH) semi-cylindrical second half that are longitudinally connectable to each other around the induction coil sleeve to coaxially position the induction coil sleeve within a cylindrical center aperture of the rotator housing.

6. The system of claim 5, wherein the RH first half comprises a plurality of RH first pin receptacles extending from opposing distal edges of the RH first half, and the RH second half comprises a plurality of RH second pin receptacles extending from opposing distal edges of the RH second half, the RH first and second halves structured such that the RH first and second halves can be oppositely positioned around the induction coil sleeve having the RH first and second pin receptacles interstitially engaged and coaxially aligned such that securing pins can be inserted through the respective engaged and aligned RH first and second pin receptacles to connect the RH first and second halves around the induction coil sleeve.

7. The system of claim 5, wherein the RH first half and the RH second half each comprises a plurality of rotator magnets mounted to a cylindrical inner surface of the respective RH first and second halves.

8. The system of claim 5, wherein each of the RH first and second halves comprise a plurality of upper roller tracks structured to receive the upper rollers or bearings of the respective ICS first and second halves and a plurality of lower roller tracks structured to receive the lower rollers or bearings of the respective ICS first and second halves such that the rotator housing is rotatably mounted to the induction coil sleeve.

9. The system of claim 8 further comprising a rotator housing retainer connectable to the rotator housing and structured and operable to retain the upper and lower rollers or bearings within the respective upper and lower roller tracks.

10. The system of claim 1 further comprising a weather protection hood coaxially mountable to and around the pole structure, the weather protection hood structured to cover at least a top portion of the induction coil sleeve and the rotator housing.

11. A wind powered electricity generating system, said system comprising:
 a two-piece cylindrical induction coil sleeve coaxially mountable to and around a pole structure, the cylindrical induction coil sleeve comprising:
  an induction coil sleeve (ICS) semi-cylindrical first half and an induction coil sleeve (ICS) semi-cylindrical second half that are longitudinally connectable to each other around the pole structure to coaxially position the pole structure within an ICS cylindrical center aperture of the induction coil sleeve;
 a two-piece cylindrical rotator housing coaxially and rotatably mountable to and around the induction coil sleeve, the rotator housing comprising:
  a rotator housing (RH) semi-cylindrical first half and a rotator housing (RH) semi-cylindrical second half that are longitudinally connectable to each other around the induction coil sleeve to coaxially position the induction coil sleeve within a RH cylindrical center aperture of the rotator housing; and
 a plurality of wind vanes mounted to the rotator housing, the wind vanes structured to capture wind and utilize the captured wind to rotate the cylindrical rotator housing about the cylindrical induction coil sleeve to generate electricity.

12. The system of claim 11, wherein the ICS first half comprises a plurality of ICS first pin receptacles extending from opposing distal edges of the ICS first half, and the ICS second half comprises a plurality of ICS second pin receptacles extending from opposing distal edges of the ICS second half, the ICS first and second halves structured such that the ICS first and second halves can be oppositely positioned around the pole structure having the ICS first and second pin receptacles interstitially engaged and coaxially aligned such that securing pins can be inserted through the respective engaged and aligned ICS first and second pin receptacles to connect the ICS first and second halves around the pole structure.

13. The system of claim 11, wherein the induction coil sleeve further comprises a sectioned induction coil having a first section mounted to the ICS first half and a second section mounted to the ICS second half, the induction coil first and second sections electrically connectable to each other via at least one decoupleable electrical connector.

14. The system of claim 11, wherein each of the ICS first and second halves comprises a plurality of upper rollers or bearings rotationally mounted to an upper portion of the ICS first and second halves, and a plurality of lower rollers or bearings rotationally mounted to a lower portion of the ICS first and second halves.

15. The system of claim 11, wherein the RH first half and the RH second half each comprises a plurality of rotator magnets mounted to a cylindrical inner surface of the respective RH first and second halves.

16. The system of claim 11, wherein each of the RH first and second halves comprise a plurality of upper roller tracks structured to receive the upper rollers or bearings of the respective ICS first and second halves and a plurality of lower roller tracks structured to receive the lower rollers or bearings of the respective ICS first and second halves such that the rotator housing is rotatably mounted to the induction coil sleeve.

17. The system of claim 16 further comprising a rotator housing retainer connectable to the rotator housing and structured and operable to retain the upper and lower rollers or bearings within the respective upper and lower roller tracks.

18. The system of claim 11 further comprising a weather protection hood coaxially mountable to and around the pole structure, the weather protection hood structured to cover at least a top portion of the induction coil sleeve and the rotator housing.

19. A wind powered electricity generating system, said system comprising:
 a cylindrical induction coil sleeve coaxially mountable to and around a pole structure, the cylindrical induction coil sleeve comprising:
  an induction coil sleeve (ICS) first half and an induction coil sleeve (ICS) second half that are connectable to each other around the pole structure to coaxially position the pole structure within an ICS cylindrical center aperture of the induction coil sleeve; and
  a sectioned induction coil having a first section mounted to the ICS first half and a second section mounted to the ICS second half, the induction coil first and second sections electrically connectable to each other via at least one decoupleable electrical connector;

a cylindrical rotator housing coaxially and rotatably mountable to and around the induction coil sleeve, the rotator housing comprising:

a rotator housing (RH) first half and a rotator housing (RH) second half that are connectable to each other around the induction coil sleeve to coaxially position the induction coil sleeve within a RH cylindrical center aperture of the rotator housing; and a plurality of rotator magnets mounted to a cylindrical inner surface of the respective RH first and second halves; and a plurality of wind vanes mounted to the rotator housing, the wind vanes structured to capture wind and utilize the captured wind to rotate the rotator magnets of the cylindrical rotator housing about the sectioned induction coil of the cylindrical induction coil sleeve to generate electricity.

* * * * *